Figure 1:
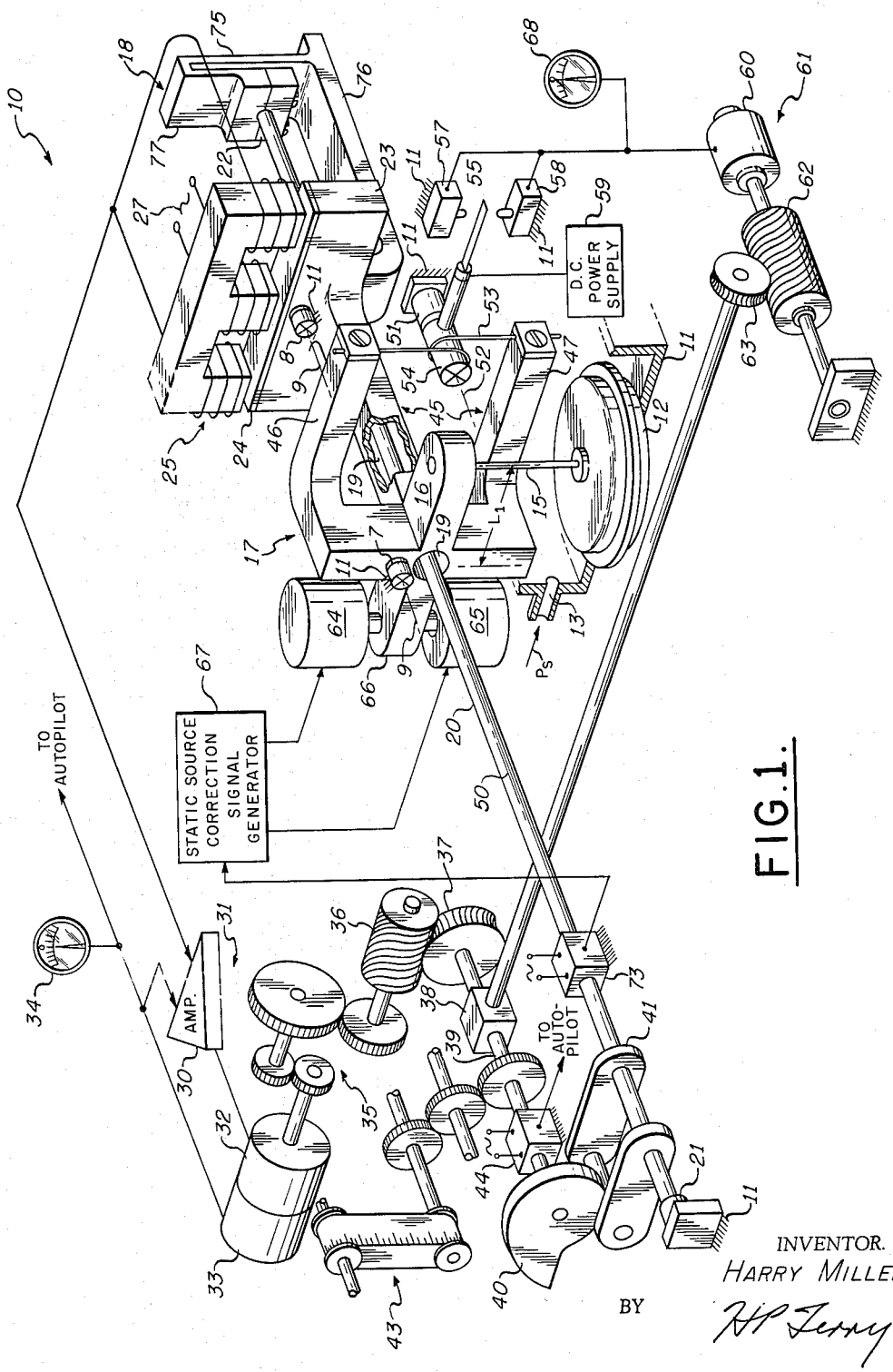

INVENTOR.
HARRY MILLER

United States Patent Office 3,259,823
Patented July 5, 1966

3,259,823
PRESSURE RESPONSIVE APPARATUS
Harry Miller, Scottsdale, Ariz., assignor to Sperry Rand Corporation, Great Neck, N.Y., a corporation of Delaware
Filed Oct. 23, 1963, Ser. No. 318,244
11 Claims. (Cl. 318—32)

This invention relates to extremely sensitive pressure responsive apparatus for measuring and/or controlling the altitude and vertical speed or airspeed and Mach number of an airplane. If used for the former purpose, the aneroid barometric unit, also referred to as the pressure capsule or bellows, is evacuated and sealed so that it expands or tends to expand with increasing altitude while if used as an airspeed responsive device, the exterior or one part of the unit is usually connected to a Pitot tube or other airspeed responsive device and the interior or other part of the unit to static pressure. Many features of the invention apply to both types of instruments but in the description that follows the invention will be shown and described as an altitude responsive device for purposes of example.

Accuracy and reliability of basic aircraft control sensors of this type is extremely important. It is not only desirable to have means for monitoring the pressure responsive apparatus to provide an indication of malfunction but it is also advisable to have auxiliary means for providing the necessary control signals in the event the primary operating means such as the primary servo fails.

In instruments of this type, it is necessary that they have high resolution while maintaining their accuracy over a large range of altitudes. The output signal should be free of errors due to calibration (scale errors) and due to aircraft static source defects which are normally a function of Mach number such as improper functioning of the static probe. Further, the accuracy of the output signal should not be impaired due to unduly high frictional effects such as that associated with conventional bearings or due to variations in dimensions of basic elements due to changing environmental or operational conditions.

In these and other respects, the present invention is an improvement over the apparatus disclosed in U.S. Patent No. 2,729,780 entitled "Altitude Control for Automatic Pilots" issued January 3, 1956 to H. Miller et al., and U.S. Patent No. 3,100,858 entitled "Pressure Rebalancing and Measuring Servo System" issued to W. J. Topazio et al. on August 13, 1963. The principal advantages which the present invention enjoys over the prior art apparatus include:

(1) Corrections are applied in a simple and reliable manner directly at the force balance mechanism. No extra differentials or servo mechanisms are required.

(2) Shaft positions resulting from the balance of forces are inherently correct. Computing mechanisms downstream from the sensor are thus simplified.

(3) The E-pickoff operates about a null position at all times.

(4) High reliability is achieved through the use of two parallel servo loops, duplicate power supplies, and by eliminating the requirement for a remote air data computer.

(5) The redundant servo loop provides much greater flexibility in the use of display techniques over the standard drum pointer configuration of present pneumatic drive indicators. As an example, vertical scale tape implementations can be obtained without sacrifice of reliability.

(6) The indicator is self-contained with respect to the pressure sensor and electronics, simplifying troubleshooting and line maintenance compared to other servo altimeter types.

(7) Accuracy is improved by the elimination of electrical data transmission errors between the display and the remote computer.

(8) Accuracy is further enhanced by the provision to accept electrical corrections for static source defects.

It is a primary object of the present invention to provide an improved pressure responsive apparatus that is extremely accurate and reliable over a wide range of operating conditions.

Another object of the present invention is to provide pressure responsive apparatus having self-monitoring provisions.

It is an additional object of the present invention to provide pressure responsive apparatus having compensating means for providing a correction signal for compensating defects including those resulting from calibration and static source errors.

It is a further object of the present invention to provide pressure responsive apparatus that is unusually accurate having substantially zero friction pivots.

It is an additional object of the present invention to provide pressure responsive apparatus having compensation for dimensional changes of basic elements due to changing environmental or operating conditions.

These and other objects are accomplished by utilizing a torsion bar force balance type of pressure responsive device having a nulling type of servo system for maintaining the pressure capsule in a substantially constant position which provides for high accuracy over a wide pressure range and is not critically dependent upon the pressure capsule displacement characteristic over the corresponding wide range. The present invention includes monitoring means for detecting malfunction of the pressure responsive apparatus as well as auxiliary servo means for driving said apparatus in the event the primary servo system fails. By means of torquers connected directly to the torsion bar, external correction signals are applied directly to the torsion bar in a simple reliable manner. Further, the torsion bar is mounted to compensate for changes in its axial length due to changes in temperature and twisting. By arranging the moment of inertia of the movable portion of the monitoring apparatus to be related to the moment of inertia of the force balance mechanism inversely as the square of the step-up ratio of the monitoring apparatus, the entire assembly is made insensitive to externally applied angular accelerations. In addition, the use of flexural pivots in lieu of conventional ball bearings minimizes frictional force and eliminates sticky or jerky operation thereby controlling the flight path of the aircraft without undesirable undulations.

Figure 2:
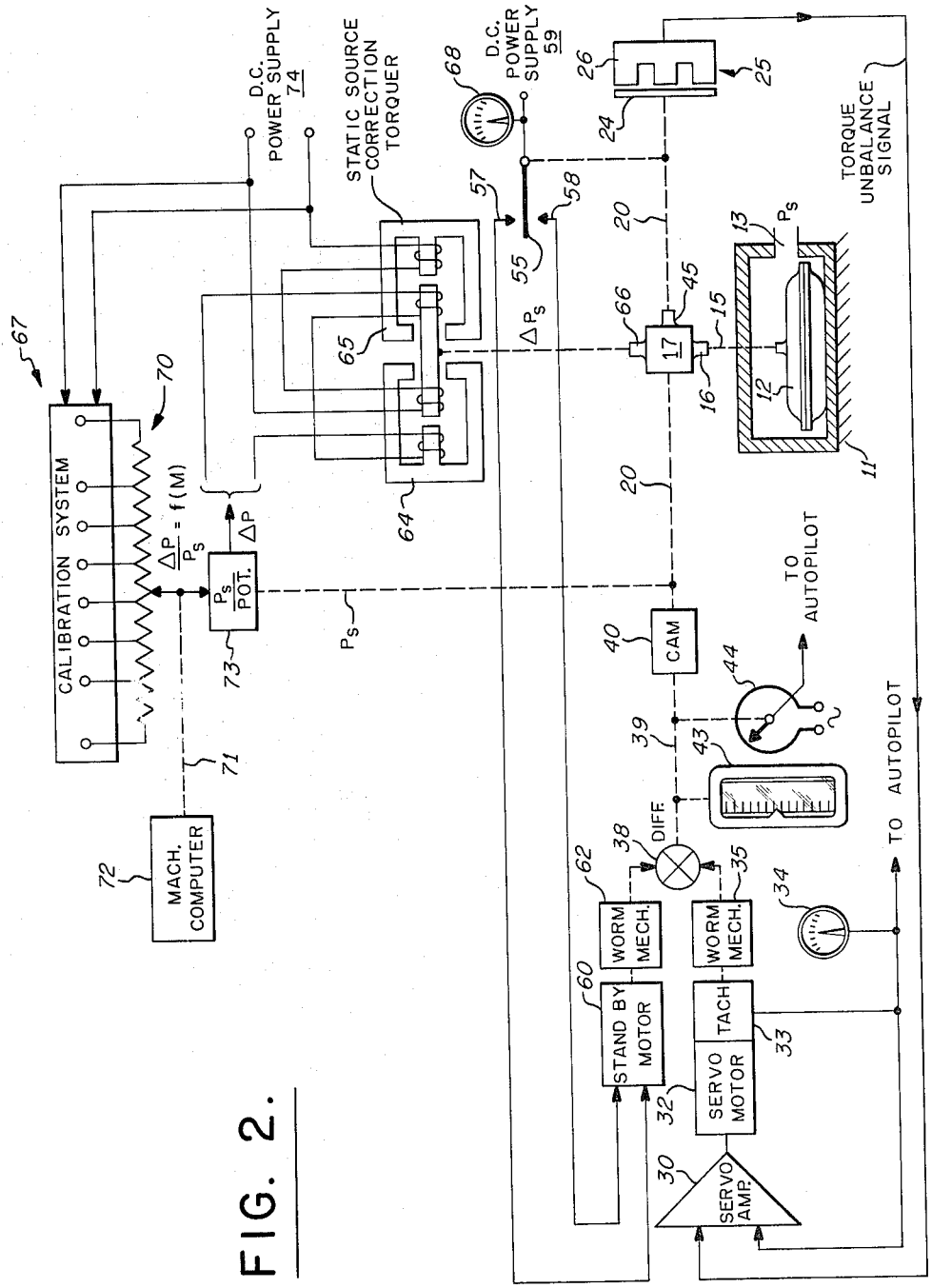

These and other objects will become apparent by referring to the drawings in which:

FIG. 1 is a perspective schematic diagram of altitude sensing apparatus incorporating the present invention; and FIG. 2 is a schematic wiring diagram of the apparatus of FIG. 1.

The pressure responsive apparatus 10 of FIG. 1 may be utilized to provide an indication of the aircraft altitude and/or vertical speed which may be utilized to control the altitude and vertical speed of an aircraft as shown, for example, in U.S. Patent 2,936,134 entitled "Longitudinal Axis Control System for Aircraft" issued to H. Miller et al. on May 10, 1960 or any of the other modes of operation as disclosed therein. The pressure responsive apparatus 10 includes an airtight housing or base 11 indicated schematically and by slant lines in which an aneroid pressure responsive capsule or bellows 12 is mounted. One end of the pressure capsule 12 is fixed to a wall of the housing 11. The pressure capsule 12 is evacuated and responsive to the pressure variations of the static pressure $P_s$ caused by changes in altitude experienced by the aircraft. The static pressure signal $P_s$ is introduced into the interior of the housing 11 through a pressure inlet conduit 13.

The movable end of the pressure capsule 12 is connected by a wire suspension 15 that is maintained in tension to a projecting lever arm 16 of a bridge member 17. The bridge member 17 is pivotally supported within the housing 11 by means of spaced flexural pivots 7 and 8 for limited movement about an axis 9. The bridge member 17 is connected by means of a torsion bar clamp 18 to a torsion bar 20 which extends through an aperture 19 in the bridge member and has its extremities mounted in a thrust bearing 21 and a clamp mount 22. The bridge member 17 further includes an armature carrier 23 upon which is mounted the movable armature 24 of a null sensing E pick-off 25 which has its stator 26 mounted on the housing 11. The center leg of the stator 26 is energized by an alternating current source 27 in order that movement of the armature 24 with respect to its stator 26 in accordance with pressure variations sensed by the pressure capsule 12 provides a signal from the pick-off 25 having an amplitude and phase representative of the magnitude and direction, respectively, of the movement of the pressure capsule 12 from a predetermined position. The output windings of the pick-off 25 are connected to a phase sensitive amplifier 30 of a primary servo means 31.

The servo means 31 includes the amplifier 30 which is connected to energize a servomotor 32. The servomotor 32 drives a tachometer generator 33 to provide a rate feedback stabilization signal to the amplifier 30 and also to provide a signal representative of the aircraft vertical speed to a vertical speed indicator 34 and a vertical speed control signal to the automatic pilot as indicated by the legend. The servomotor 32 also drives a high ratio gear train 35 which includes an irreversible worm 36 and worm gear 37. The worm gear 37 is connected through a differential 38 by a shaft 39 to a cam 40 which can be shaped to be a function of pressure such as log, altitude, knots, etc. In the discussion that follows this function is shaped to provide altitude information. The cam 40 in turn drives a pressure cam follower 41 which is connected to rotate the torsion bar 20 about its longitudinal axis 50 to convert the torsion bar twist angle which is proportional to pressure to motor displacements and speeds which are proportional to altitude and vertical speed, respectively. The rotation of the shaft 39 is thus representative of the altitude and may be connected to provide an indication thereof on the altimeter 43 and an altitude control signal representative thereof from a potentiometer 44 to the automatic pilot as indicated by the legend. The longitudinal axis 50 is parallel the axis 9.

In order to provide self-monitoring of the pressure responsive apparatus 10, in accordance with the teachings of the present invention, the bridge member 17 has a bifurcated portion 45 consisting of projecting arms 46 and 47 disposed in a plane perpendicular to the longitudinal axis 50 of the torsion bar 20 and extending outwardly in spaced relation. Between the extremities of the spaced arms 46 and 47, a cylindrical flexural pivot 51 is pivotally supported about an axis 52 parallel to the longitudinal axis 50. A fine wire 53 is wound around one partion 54 of the flexural pivot 51 and the wire 53 has its extremities fastened to the respective extremities of the arms 46 and 47 in order that the movement of the torsion bar 20 is transmitted to the portion 54 of the flexural pivot 51. The movement of the torsion bar 20 is amplified by means of the lever arm defined by the length of the arms 46 and 47 and the radius of the portion 54 of the flexural pivot 51. The contact arm 55 of a monitor switch 56 is connected to the portion 54 of the flexural pivot 51 for rotation therewith. A pair of fixed contacts 57 and 58 of the switch 56 are mounted on the housing 11 cooperative with the contact arm 55 in order that contact is made and a monitor signal provided when the rotation of the torsion bar 20 exceeds a predetermined amount representative of a malfunction in a manner to be more fully explained. The motion of the torsion bar 20 is further amplified as a function of the length of the contact arm 55.

In order to provide stand-by operation of the pressure responsive apparatus 10 in the event of a malfunction of the primary servo means 31, a D.C. power supply 59 is connected by a flexible lead to the contact arm 55 and the contacts 57 and 58 are connected to a stand-by servomotor 60 of an auixiliary on-off servo means 61. The stand-by servomotor 61 is connected to another input of the differential 38 through an irreversible worm 62 and worm gear 63. A malfunction indicator 68 is connected to the contact arms 57 and 58 and responsive to the monitor signal for providing a visual indication of a malfunction.

The rotation of the contact assembly is arranged to be of opposite sense to that of the force balance mechanism. By arranging the moment of inertia of the contact assembly to be related to the moment of inertia of the force balance mechanism inversely as the square of the step-up ratio, the entire assembly is made insensitive to externally applied angular accelerations. This reduces the vibration susceptibility of the sensor and makes it more accurate in an adverse environment. The moment of inertia of the assembly consisting of armature support 23, carrier 16, torquer arm 66, and arms 46, and 47 is made equal to the moment of inertia of assembly 55 and 54 multiplied by the square of the step-up ratio between the rotation of the assembly 17 and the contactor assembly 55.

In accordance with the present invention, the scale error and static source compensation is provided by applying correction torques to the torsion bar 20 through the bridge member 17 by means of a pair of spaced electromagnetic torquers 64 and 65. The torquers 64 and 65 are connected to opposite sides of a projecting arm 66 of the bridge member 17 for applying a corrective torque directly to the torsion bar 20 through the bridge 17 thereby eliminating additional servo mechanisms or differentials and permitting the E pick-off 25 to operate about a null position at all times, in a manner to be more fully explained. The correction signals applied to the torquers 64 and 65 may compensate errors due to miscalibration of the pressure responsive apparatus 10, improper orientation of the static probe with respect to the airplane or other error inducing signals. The correction signal is generated in a static source correction signal generator 67 which is connected to excite the coils of the torquers 64 and 65 to produce a torque around the torsion bar 20 in a direction to compensate the error signal. The static source correction signal may be computed, for example, as shown in FIG. 2 as a function of Mach number and static pressure by means of a tapped linear potentiometer 70 for providing a function of Mach number driven by a Mach shaft 71 from a Mach computer 72 and a $P_s$ potentiometer 73 driven by the torsion bar 20. A signal representative of a function of Mach number which is equal to $\Delta_p/P_s$ energizes the winding of the potentiometer 73 while its slider is positioned in accordance with a signal representative of $P_s$. The correction signal from the potentiometer 73 is thus representative of $\Delta P$ which may be used directly without amplification to excite the coils of torquers 64 and 65. A low impedance regulated D.C. power supply 74 is used to excite the torquer fixed field winding while the torquer controlled field windings are connected such that control field current will aid one fixed field winding and oppose the other, as shown in FIG. 2. A torque will thus be applied to the torsion bar 20 which is linear with the control field correction current to compensate for scale errors and aircraft static source defects.

The torsion bar 20 when subjected to twisting or to temperature changes will shorten or lengthen in the direction of its longitudinal axis 50. The servo or left end of the torsion bar 20 is rotatably supported by the ball thrust bearing 21 such that only the pick-off or right end of the torsion bar 20 will shorten or lengthen. In order to compensate for the changes in the axial length of the torsion bar 20, the flexible U-shaped torsion bar clamp 18 has one leg 75 fixed to the armature carrier 23 by a bracket 76 while the clamp mount 22 on its other leg 77 supports the right extremity of the torsion bar 20 and flexes to compensate for changes in the torsion bar length.

A feature of the pressure responsive apparatus 10 is the absence of any friction pivots in the force balance mechanism. All pivots are of the flexure type, e.g. flexural pivots 7 and 8. This gives the instrument its excellent threshold and sensitivity characteristics. The sensor also has excellent vibration and shock characteristics. These are due in part to the fine balance and weight distribution of the sensitive element. No delicate jewel bearings are used. The superior performance of the sensor compared to other force balance devices of the beam balance or vector type arises in part because the weight distribution does not vary with the magnitude of the pressure being measured. No complicated mechanisms are required to shift weights as a function of pressure.

In operation, the pressure capsule 12 is subjected to a pressure difference between the external static pressure $P_s$ and the evacuated internal chamber of the pressure capsule 12. The force exerted by the pressure is transmitted to the bridge member 17 through the wire suspension 15. This force applies a moment to the bridge member 17 which is proportional to the differential pressure multiplied by the lever arm length $L_1$ and operates against the torque exerted by the torsion bar 20. The rotation of the bridge member 17 causes rotation of the armature 24 which results in an unbalance signal from the E pick-off 25. After amplification in the amplifier 30, this unbalance signal energizes the servomotor 32 which drives the tachometer generator 33. The servomotor 32 also drives through the gear train 35 and the pressure cam 40 to cause the servo or left end of the torsion bar 20 to twist through an angle and in a direction to counteract the pressure torque. This tends to rebalance the armature 24 with respect to the stator 26 of the E pick-off 25 producing a null or zero output signal thereby providing control signals representative of altitude and vertical speed as explained previously.

Due to its nulling type of operation, the pressure responsive apparatus 10 normally follows up very rapidly and operates in the vicinity of a null condition. Thus the torsion bar 20 only rotates through a very small angle before the primary servo means 31 returns it to substantially null. In the event of a mulfunction, the torsion bar 20 is driven through a substantially greater angle. The angle thorugh which the torsion bar 20 is rotated is transmitted to the contact arm 55 of the monitor switch 56 with the motion of the torsion bar 20 being amplified in a manner explained previously. When the force unbalance, i.e., the torsion bar rotation, exceeds a predetermined amount representative of a mulfunction as defined by the spacing of the contacts 57 and 58, the contact arm 55 contacts one of the contacts 57 or 58 thereby causing current to flow from the D.C. power supply 59 connected to the contact arm 55 through the contact 57 or 58 to provide a monitor signal which may be used to provide a mulfunction indication on the indicator 68 and to drive the stand-by servomotor 60 in a direction to return the torsion bar 20 to its null position. One of the principal advantages of this type of monitoring and stand-by operation is that the large mechanical step-up motion of the contact arm 55 is achieved without adding any stiction to the basic force balance sensing mechanism by winding the fine stranded wire 53 around the flexural pivot 51. Further, the use of a on-off auxiliary servo in parallel with the primary proportional servo provides high reliability and has all the flexiblity advantages of a high gain servo drive with its inherent ability to overcome friction.

While the invention has been described in its preferred embodiments, it is to be understood that the words which have been used are words of description rather than limitation and that changes may be made within the purview of the appended claims may be made without departing from the true scope and spirit of the invention in its broader aspects.

What is claimed is:
1. In pressure responsive apparatus,
   (a) a torsion member having a longitudinal axis,
   (b) pressure capsule means movable in response to pressure variations and connected to apply a torque about the longitudinal axis of said torsion member tending to rotate said torsion member as a function of said pressure variations,
   (c) pick-off means for providing a signal representative of the movement of said torsion member,
   (d) servo means responsive to said pick-off signal for rotating said torsion member in a direction tending to eliminate said pick-off signal whereby said apparatus tends to operate about a null condition,
   (e) and monitoring means including switch means having a first portion responsive to the amplified movement of said torsion member and cooperative with a second fixed portion having elements spaced to permit contact with said first portion for providing a monitor signal only when the rotation of said torsion member exceeds a predetermined angle indicative of malfunction of said apparatus.
2. In appaartus of the character described in claim 1 further including
   (a) means for generating a signal respresentative of the composite errors causing deviation of said torsion member from a null condition in the absence of pressure variations,
   (b) and correction torquing means connected to said torsion member and responsive to said composite error signal for returning said torsion member to a null condition in the absence of pressure variations.
3. In apparatus of the character described in claim 1 further including normally ineffective auxiliary servo means in parallel with said aforementioned servo means and connected to said second portion of said switch means for driving said torsion member as a function of said monitor signal in the event of malfunction of said apparatus.
4. In pressure responsive apparatus,
   (a) a torsion bar having a longitudinal axis,
   (b) pressure capsule means movable in response to pressure variations and connected to apply a torque about the longitudinal axis of said torsion bar tending to rotate said torsion bar as a function of said pressure variations,
   (c) pick-off means for providing a signal representative of the movement of said torsion bar
   (d) servo means responsive to said pick-off signal for rotating said torsion bar in a direction tending to eliminate said pick-off signal whereby said apparatus tends to operate about a null condition,
   (e) and monitoring means including switch means having a contact arm responsive to the amplified movement of said torsion bar and cooperative with a pair of fixed contacts spaced to permit contact with said contact arm for providing a monitor signal only when the rotation of said torsion bar exceeds a predetermined angle indicative of malfunction of said apparatus.
5. In apparatus of the character described in claim 4 further including
   (a) means for generating a signal representative of the composite errors causing deviation of said torsion member from a null condition in the absence of pressure variations,

(b) and electromagnetic torquing means connected to said torsion bar and responsive to said composite error signal for applying a torque to said torsion bar in a direction to compensate for said composite errors.

6. In apparatus of the character described in claim 4 further including normally ineffective auxiliary servo means connected to said fixed contacts of said switch means for driving said torsion bar as a function of said monitor signal in a direction tending to eliminate said monitor signal.

7. In apparatus of the character described in claim 4 in which said torsion bar tends to change in length when subjected to twisting and to temperature changes, further including flexible clamping means connected to one end of said torsion bar for flexing to compensate for changes in said torsion bar length.

8. In apparatus of the character claimed in claim 4 in which said monitoring means includes a member connected for rotation with said torsion bar and having a bifurcated portion extending from said longitudinal axis between which a cylindrical element is pivotally supported about an axis parallel to said longitudinal axis by flexural pivot means, a fine wire wound around said cylindrical element and connected to said bifurcated portion for rotating said cylindrical element in accordance with an amplified version of the movement of said torsion bar, said contact arm being connected to said cylindrical element for movement therewith.

9. In apparatus of the character described in claim 8 in which said cylindrical element and said flexural pivot means form an integral unit.

10. In apparatus of the character described in claim 8 in which said contact arm rotates in an opposite direction with respect to said torsion bar and has a moment of inertia related to the moment of inertia of said torsion bar and its associated movable elements inversely as the square of said amplification ratio.

11. In pressure responsive apparatus,
(a) a torsion member having a longitudinal axis,
(b) pressure capsule means movable in response to pressure variations and connected to apply a torque about the longitudinal axis of said torsion member tending to rotate said torsion member as a function of said pressure variations,
(c) pick-off means for providing a signal representative of the movement of said torsion member,
(d) servo means responsive to said pick-off signal for rotating said torsion member in a direction tending to eliminate said pick-off signal whereby said apparatus tends to operate about a null condition,
(e) means for generating a signal representative of the composite errors causing deviation of said torsion member from a null condition in the absence of pressure variations,
(f) and correction torquing means connected to said torsion member and responsive to said composite error signal for returning said torsion member to a null condition in the absence of pressure variations.

No references cited.

JOHN F. COUCH, *Primary Examiner.*